United States Patent
Arora et al.

(10) Patent No.: US 7,669,083 B2
(45) Date of Patent: Feb. 23, 2010

(54) SYSTEM AND METHOD FOR RE-SHUFFLING TEST CASE INSTRUCTION ORDERS FOR PROCESSOR DESIGN VERIFICATION AND VALIDATION

(75) Inventors: Sampan Arora, Karnataka (IN); Sandip Bag, Karnataka (IN); Vinod Bussa, Hi-tech (IN); Shubhodeep Roy Choudhury, Karnataka (IN); Manoj Dusanapudi, Karnataka (IN); Sunil Suresh Hatti, Karnataka (IN); Shakti Kapoor, Austin, TX (US); Batchu Naga Venkata Satyanarayana, Karnataka (IN); Shiraz Mohammad Zaman, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 11/853,130

(22) Filed: Sep. 11, 2007

(65) Prior Publication Data

US 2009/0070631 A1   Mar. 12, 2009

(51) Int. Cl.
  *G06F 11/00* (2006.01)
(52) U.S. Cl. .............................. 714/25; 714/32; 714/35; 714/38; 717/124

(58) Field of Classification Search ................. 714/25, 714/32, 35, 38; 717/124; 716/4, 5
See application file for complete search history.

(56) References Cited

U.S. PATENT DOCUMENTS

| | | | |
|---|---|---|---|
| 4,800,486 A | 1/1989 | Horst | 364/200 |
| 5,488,573 A | 1/1996 | Brown | 364/578 |
| 6,684,359 B2 | 1/2004 | Noy | 714/741 |
| 7,010,734 B2 | 3/2006 | Brahme | 714/724 |
| 7,133,816 B2 | 11/2006 | Adir | 703/14 |

*Primary Examiner*—Robert Beausoliel
*Assistant Examiner*—Charles Ehne
(74) *Attorney, Agent, or Firm*—VanLeeuwen & VanLeeuwen; Matthew B. Talpis (57) ABSTRACT

A system and method for creating multiple test case scenarios from one test case by shuffling the test case instruction order while maintaining relative sub test case instruction order intact is presented. A test case generator generates and provides a test case that includes multiple sub test cases to a test case executor. In turn, the test case executor recursively schedules and dispatches the test case with different shuffled instruction orders to a processor in order to efficiently test the processor. In one embodiment, the test case generator provides multiple test cases to the test case executor. In another embodiment, the test case generator provides test cases to multiple test case executors that, in turn, shuffle the test cases and provide the shuffled test cases to their respective processor.

20 Claims, 10 Drawing Sheets

SYSTEM AND METHOD FOR RE-SHUFFLING TEST CASE INSTRUCTION ORDERS FOR PROCESSOR DESIGN VERIFICATION AND VALIDATION

BACKGROUND OF THE INVENTION

1. Technical Field

The present invention relates to a system and method for re-shuffling test case instruction orders for processor design verification and validation. More particularly, the present invention relates to a system and method for creating multiple test case scenarios from one test case by shuffling the test case instruction order while maintaining relative sub test case instruction order intact.

2. Description of the Related Art

Processor testing tools exist whose goal is to generate the most stressful test case for a processor. In theory, the generated test case should provide maximum test coverage and should be interesting enough to stress various timing scenarios on the processor. The whole technology of these tools sits in the logic of building these test cases.

Verifying and validating a processor using test cases typically includes three stages, which are 1) test pattern build stage, 2) test pattern execution stage, and 3) validation and verification stage. A challenge found is that a large amount of test cases are usually generated in order to sufficiently test a processor. Unfortunately, this consumes a tremendous amount of upfront time, which leaves little time to test the processor.

What is needed, therefore, is a system and method for efficiently testing a processor without spending a large amount of time generating test cases.

SUMMARY

It has been discovered that the aforementioned challenges are resolved using a system and method for creating multiple test case scenarios from one test case, where each test scenario produces the same result, by dividing the test case into sub test cases and shuffling the instruction order while maintaining the relative sub test case instruction order. A test case generator generates and provides a test case, which includes multiple sub test cases, to a test case executor. In turn, the test case executor recursively schedules and dispatches the test case with different shuffled instruction orders to a processor in order to efficiently test the processor. By using the same test case and reshuffling the instruction order, less time is spent generating new test cases, which allows more time to test the processor.

A test case generator operates in a user mode and generates a test case for use in testing a processor. The test case includes a plurality of sub test cases, each of which includes a set of instructions that are organized in a particular instruction order (e.g., first instruction order). During the test case build stage, the test case generator allocates processor resource sets (e.g., registers, memory, etc.) to each individual sub test case, and selects instructions to include into the sub test case based upon the resources allocated for the particular sub test case.

A test case executor operates in a kernel mode, and receives the test case from the test case generator. The scheduler schedules the test case with the first instruction order to a dispatcher. In turn, the dispatcher dispatches the test case to the processor. The processor executes the test case in the "first instruction order" and, when finished executing the test case, the processor passes hardware results to a results comparator. The results comparator evaluates the results and sends a pass or fail message to the scheduler.

When the hardware results pass, the scheduler passes the test case to a shuffler. The shuffler "shuffles" the instruction order of the test case to create a second instruction order. The shuffler's criteria for shuffling instructions is to maintain the relative instruction order within a particular sub test case, and shuffle instructions from other sub test cases between each other. In addition, the shuffler keeps branch instruction blocks together and generic instruction blocks together.

The shuffler provides the shuffled test case with the second instruction order to the scheduler, and the scheduler passes the shuffled test case to the dispatcher, which dispatches the shuffled test case to the processor. The processor executes the shuffled test case in the "second instruction order" and passes hardware results to the results comparator. Again, the results comparator evaluates the results and sends a pass or fail message to the scheduler.

The test case executor proceeds to re-shuffle and dispatch shuffled test cases "n" times in order to sufficiently test the processor. In one embodiment, the test case generator provides multiple test cases to the test case executor. In this embodiment, the test case executor shuffles and dispatches a test case with a particular instruction order, one at a time, or chosen after each execution round, to the processor until each of the test cases has been shuffled a sufficient amount of times to fully test the processor.

In another embodiment, the test case generator provides test cases to multiple test case executors that, in turn, shuffle the test cases and provide the shuffled test cases to their respective processor. In yet another embodiment, when multiple test cases are provided to multiple processors, each test case executor picks and shuffles their respective test cases accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
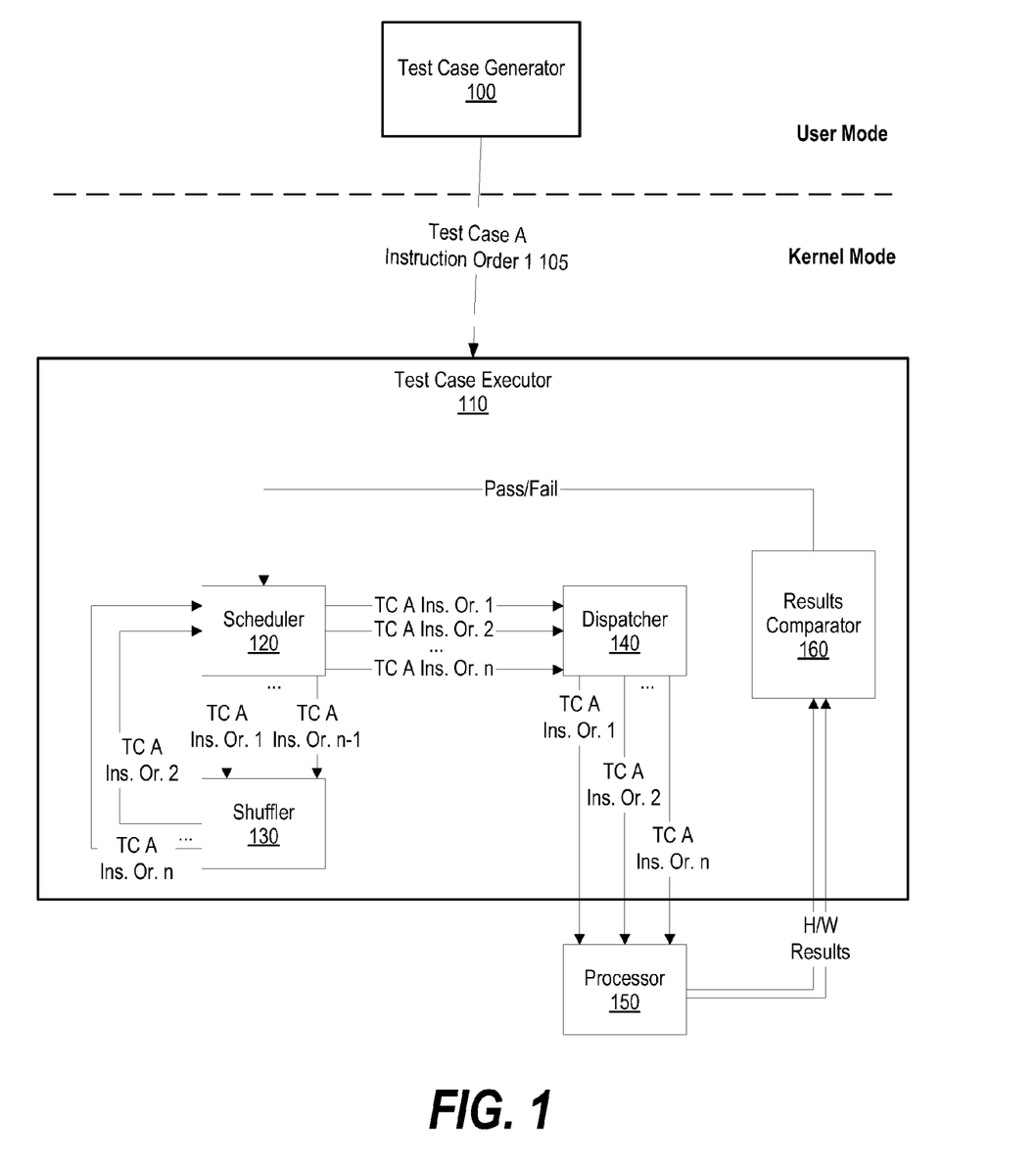
FIG. 1 is a diagram showing a test case executor re-scheduling and re-dispatching a test case with different shuffled instruction orders to a processor in order to efficiently test the processor.

FIG. 1 is a diagram showing a test case executor re-scheduling and re-dispatching a test case with different shuffled instruction orders to a processor in order to efficiently test the processor. By using the same test case and reshuffling the instruction order, a system tester spends less time generating test cases, which allows more time to test processor 150.

Test case generator 100 operates in a user mode and generates test case A 105 for use in testing processor 150. The test case includes a plurality of sub test cases, each of which includes a set of instructions that are organized in a particular instruction order (instruction order 1). For example, a test case may include a first sub test case and a second sub test case. The first sub test case may include five instructions that are organized in a particular instruction order, and the second sub test case may include ten instructions that are organized in a particular instruction order. During the test case build stage, test case generator 100 allocates processor resource sets to each individual sub test case, and selects instructions to insert into the sub test case based upon the resources allocated to the particular sub test case.

Test case executor 110 operates in a kernel/privilege mode, and receives test case A 105 from test case generator 100. Scheduler 120 schedules the test case with the instructions in its initial instruction order 1 to dispatcher 140. In turn, dispatcher 140 dispatches the test case (instruction order 1) to processor 150.

Processor 150 executes the test case (instruction order 1) and, when finished executing the test case, processor 150 passes hardware results to results comparator 160. Results comparator 160 evaluates the results and sends a pass or fail message to scheduler 120.

When the hardware results pass, scheduler 120 passes the test case (instruction order 1) to shuffler 130. Shuffler 130 "shuffles" the instruction order of the test case to create "instruction order 2." Shuffler 130's criteria is to keep the relative instruction order within a particular sub test case the same, but other instructions from other sub test cases may be inserted between each other (see FIG. 2 and corresponding text for further details). In addition, shuffler 130 keeps branch instruction blocks together, or any other instruction block that needs to stay together (see FIGS. 3, 4, and corresponding text for further details).

Shuffler 130 provides the shuffled test case (instruction order 2) to scheduler 120. Scheduler 120 passes the shuffled test case (instruction order 2) to dispatcher 140, which dispatches the shuffled test case (instruction order 2) to processor 150.

Processor 150 executes the shuffled test case (instruction order 2) and passes hardware results to results comparator 160. Again, results comparator 160 evaluates the results and sends a pass or fail message to scheduler 120.

Test case executor 110 proceeds to re-shuffle and dispatch shuffled test cases "n" times in order to sufficiently test processor 150. As can be seen, test case generator 100 generated one test case for use in fully testing processor 150.

Figure 2:
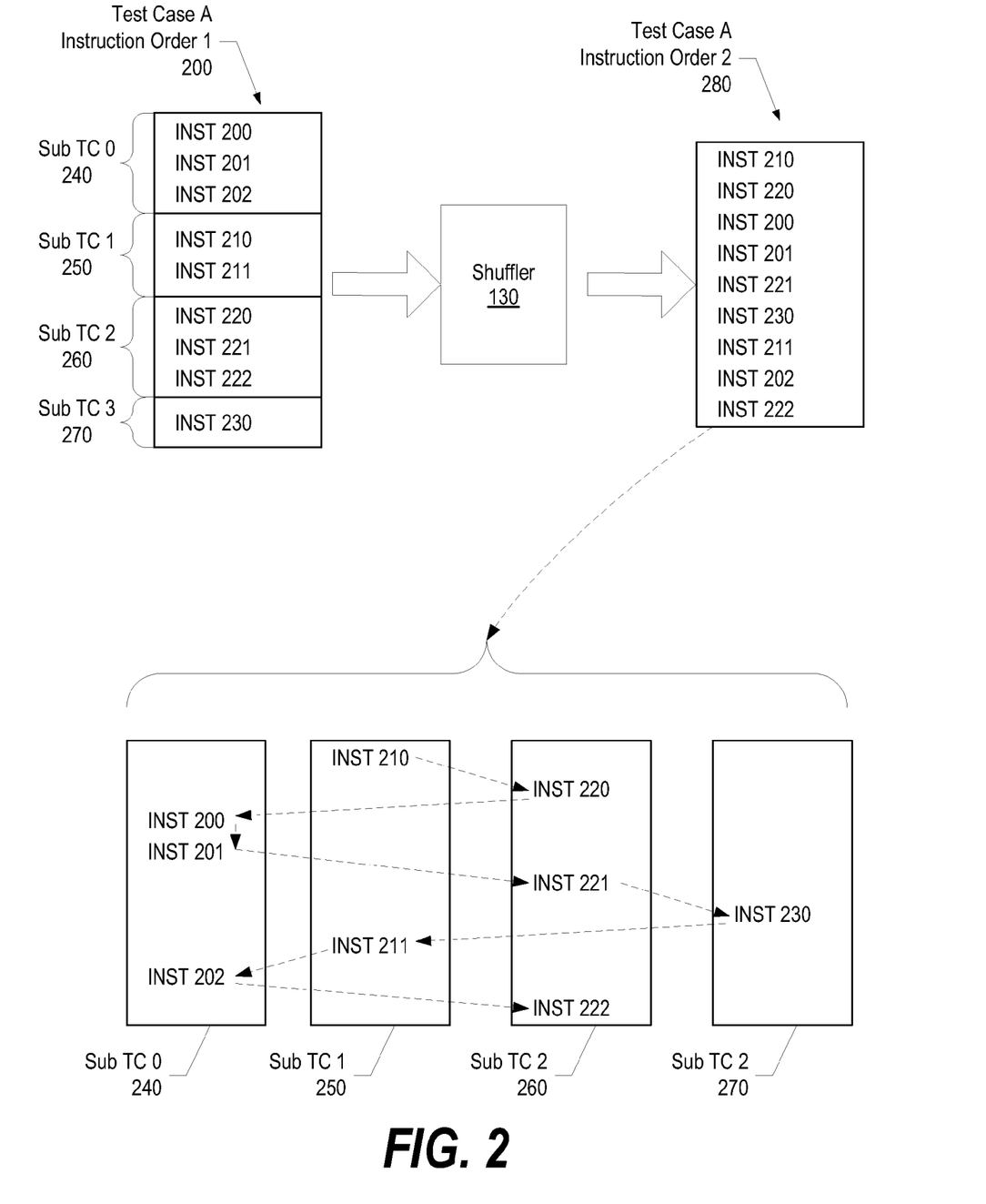
FIG. 2 is a diagram showing a shuffler shuffling a test case's instruction order while leaving relative sub test case instruction orders intact.

FIG. 2 is a diagram showing a shuffler shuffling a test case's instruction order while leaving relative sub test case instruction orders intact. Test case A (instruction order 1) 200 includes sub test cases 240 through 270. Each sub test case includes one or more instructions that are organized into a particular sub test case instruction order. For example, sub test case 0 240 includes instructions 200, 201, and 202 that are organized in such a way that instruction 200 executes first, then instruction 201, and finally instruction 202.

Shuffler 130 receives test case A (instruction order 1) 200 and shuffles the order of instructions 200-230, which results in test case A (instruction order 2) 280. Although the instructions from different sub test cases are intermingled between each other, the relative sub test case instruction order for each sub test case remains the same.

To illustrate, FIG. 2 shows test case A (instruction order 2) 280's instruction order broken out into their respective sub test cases. Instruction 210 executes first (sub test case 1 250), and then instruction 220 (sub test case 2 260). Next, instructions 200-201 execute (sub test case 0 240), and then instruction 221 (sub test case 2 260), etc. As can be seen, although test case A (instruction order 2) 280 jumps between sub test cases during execution, the relative sub test case instruction order for each sub test case remains the same. Using sub test case 2 260 as an example, even though other instructions execute between instructions 220 through 222, instruction 220 still executes before instruction 221, which executes before instruction 222.

Figure 3:
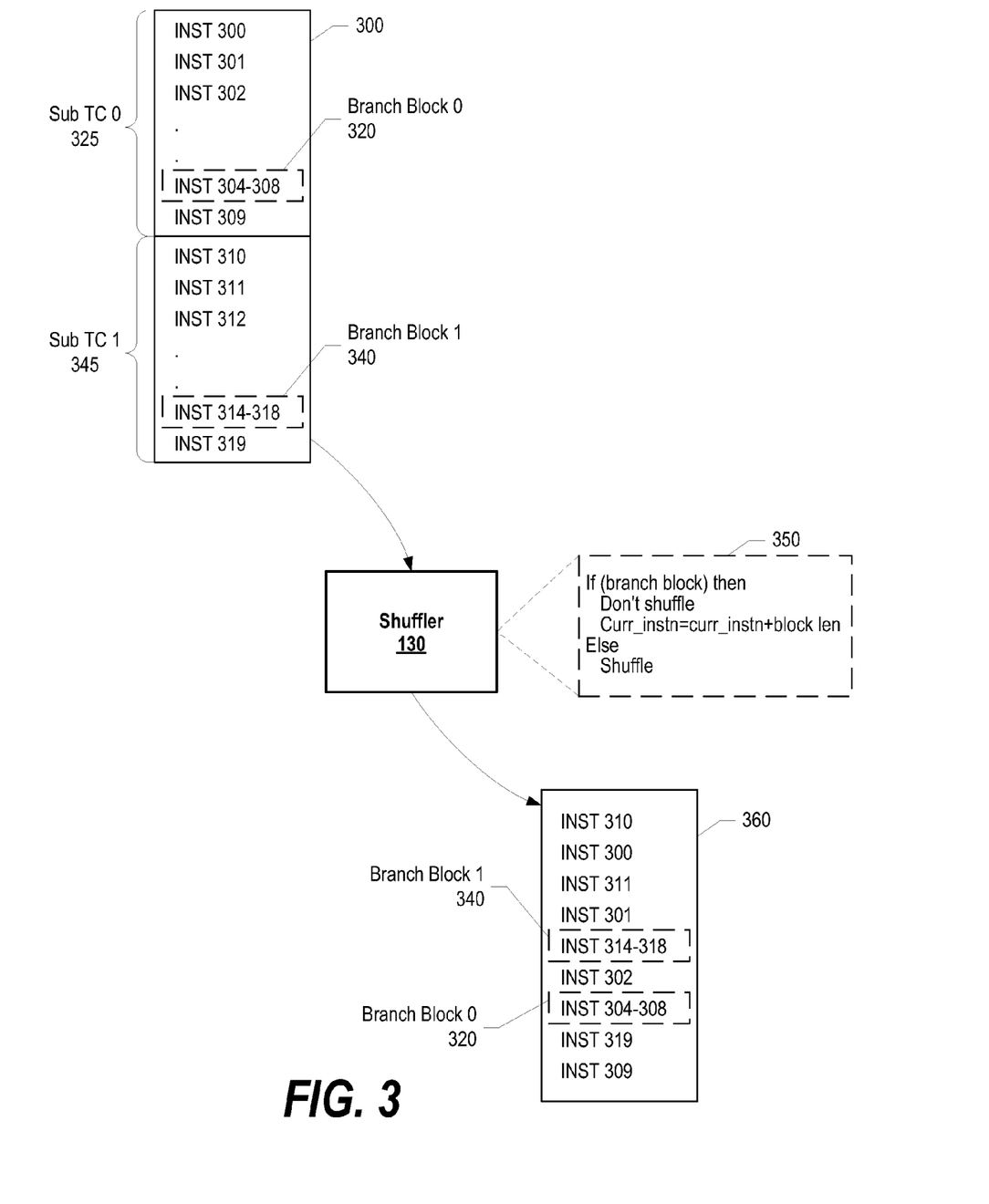
FIG. 3 is a diagram showing a shuffler keeping instructions included in a branch instruction block together during the process of shuffling a test case.

FIG. 3 is a diagram showing a shuffler keeping instructions included in a branch instruction block together during the process of shuffling a test case. Test case (instruction order 1) 300 includes sub test case 0 325 and sub test case 1 345. Sub test case 0 325 includes instructions 300-309 and sub test case 1 345 includes instructions 310-319. In addition, some instructions in each sub test case comprise a branch instruction block (branch block 0 320 and branch block 1 340). A branch instruction block includes one or more instructions that correspond to a branch instruction. While shuffling a test case, shuffler 130 uses code 350 to identify branch instruction blocks and keep them intact by tracking the branch's start instruction number and the length of the block.

As a result, when shuffler 130 shuffles test case (instruction order 1) 300 and produces test case (instruction order 2) 360, branch instruction blocks 320 and 340 remain intact all the while that instructions from sub test case 0 325 and sub test case 1 345 are intermingled.

Figure 4:
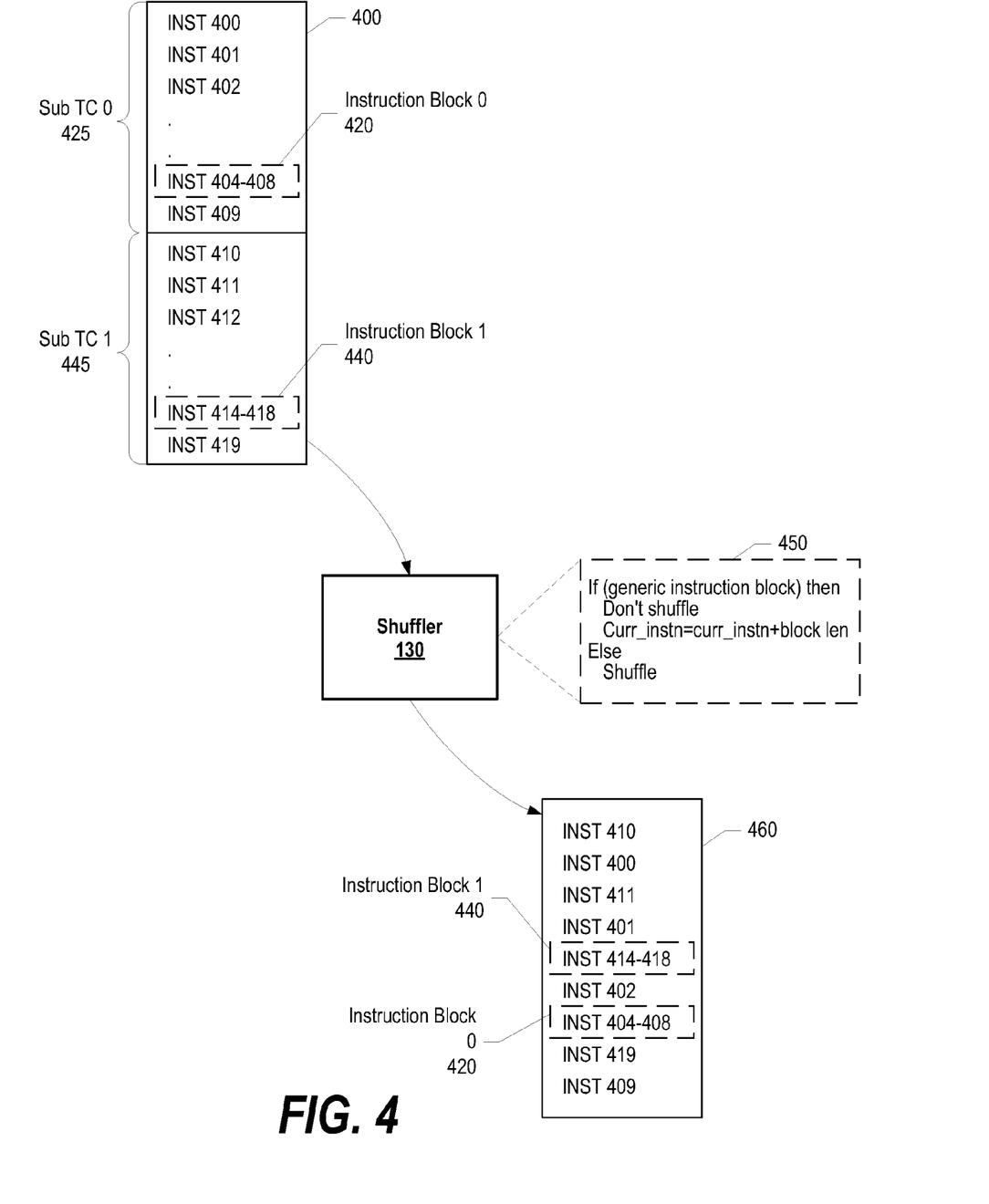
FIG. 4 is a diagram showing a shuffler keeping instructions included in generic instruction blocks together during the process of shuffling test cases to test a multi-thread/processor system.

FIG. 4 is a diagram showing a shuffler keeping instructions included in a generic instruction block together during the process of shuffling a test case. Test case (instruction order 1) 400 includes sub test case 0 425 and sub test case 1 445. Sub test case 0 425 includes instructions 400-409 and sub test case 1 445 includes instructions 410-419. In addition, some instructions in each sub test case comprise a generic instruction block (instruction block 0 420 and instruction block 1 440). While shuffling a test case, shuffler 130 uses code 450 to identify generic instruction blocks and keep them intact by tracking the generic instruction's start number and the length of the block.

As a result, when shuffler 130 shuffles test case (instruction order 1) 400 and produces test case (instruction order 2) 460, instruction blocks 420 and 440 remain intact all the while that instructions from sub test case 0 425 and sub test case 1 445 are intermingled.

Figure 5:
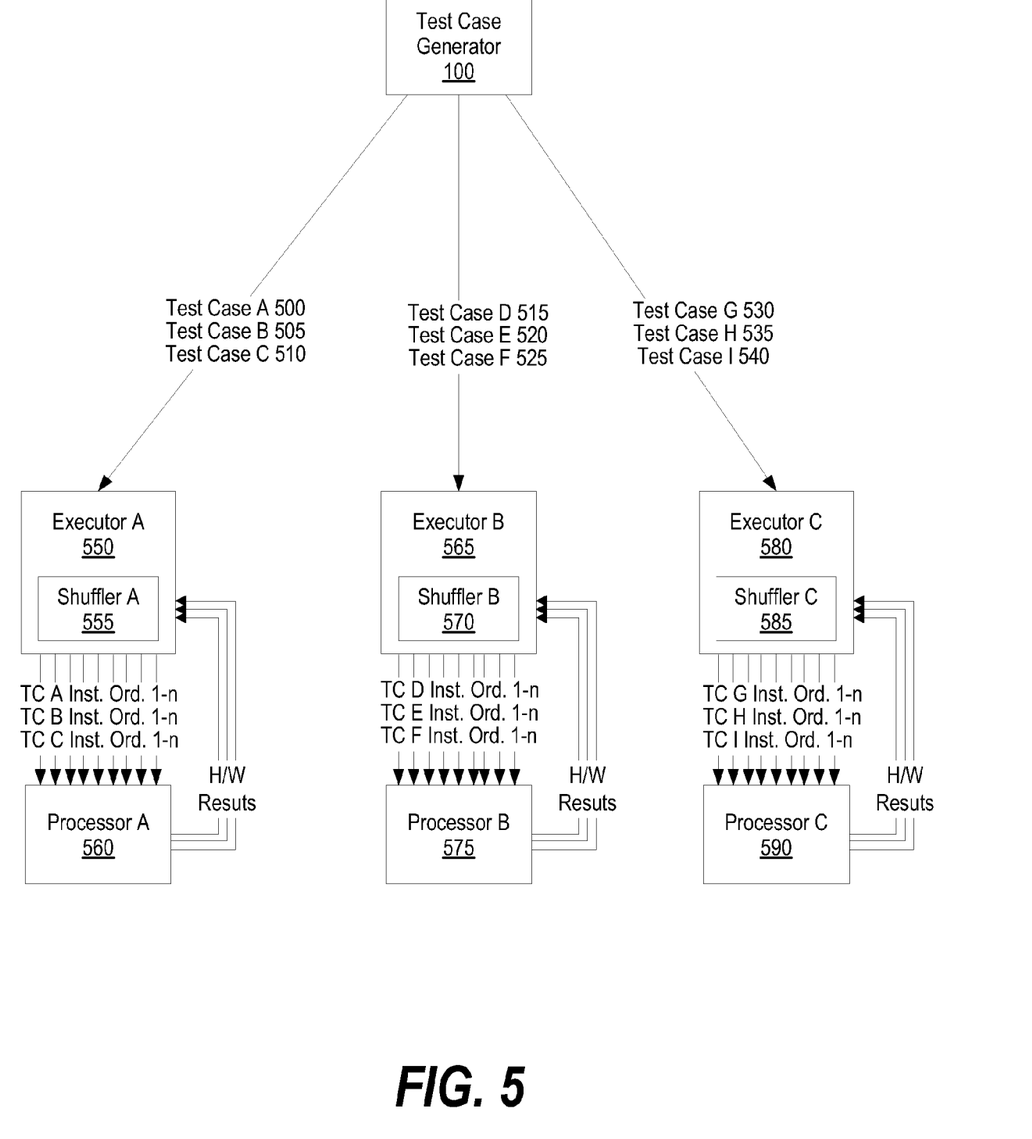
FIG. 5 is a diagram showing a test case generator providing multiple test cases to multiple test case executors that, in turn, shuffle the test cases accordingly to fully test their respective processor.

FIG. 5 is a diagram showing a test case generator providing multiple test cases to multiple test case executors that, in turn, shuffle the test cases accordingly to fully test their respective processor.

Test case generator 100 generates test cases 500-540. Each test case includes multiple sub test cases as previously discussed herein. Test case generator 100 provides test cases 500-510 to executor A 550, test cases 515-525 to executor B 565, and test cases 530-540 to executor C 580.

Executor A 550 uses shuffler A 555 to schedule and dispatch one of test cases 500-510 to processor A 560. For each scheduling and dispatching, shuffler A 555 selects one of test cases 500-510 and shuffles the test case accordingly to generate a shuffled test case with a particular instruction order. Executor A 550 and shuffler A 555 continue to re-shuffle, schedule, and dispatch test cases 500-510, one at a time, to processor A 560 until each of the test cases has been shuffled a sufficient amount of times to fully test processor A 560 (see FIG. 6 and corresponding text for further details). Likewise, executor B 565 and shuffler B 570 perform the same actions using test cases 515-520 to fully test processor B 575, and executor C 580 and shuffler C 585 perform the same actions using test cases 530-540 to fully test processor C 590.

Figure 6:
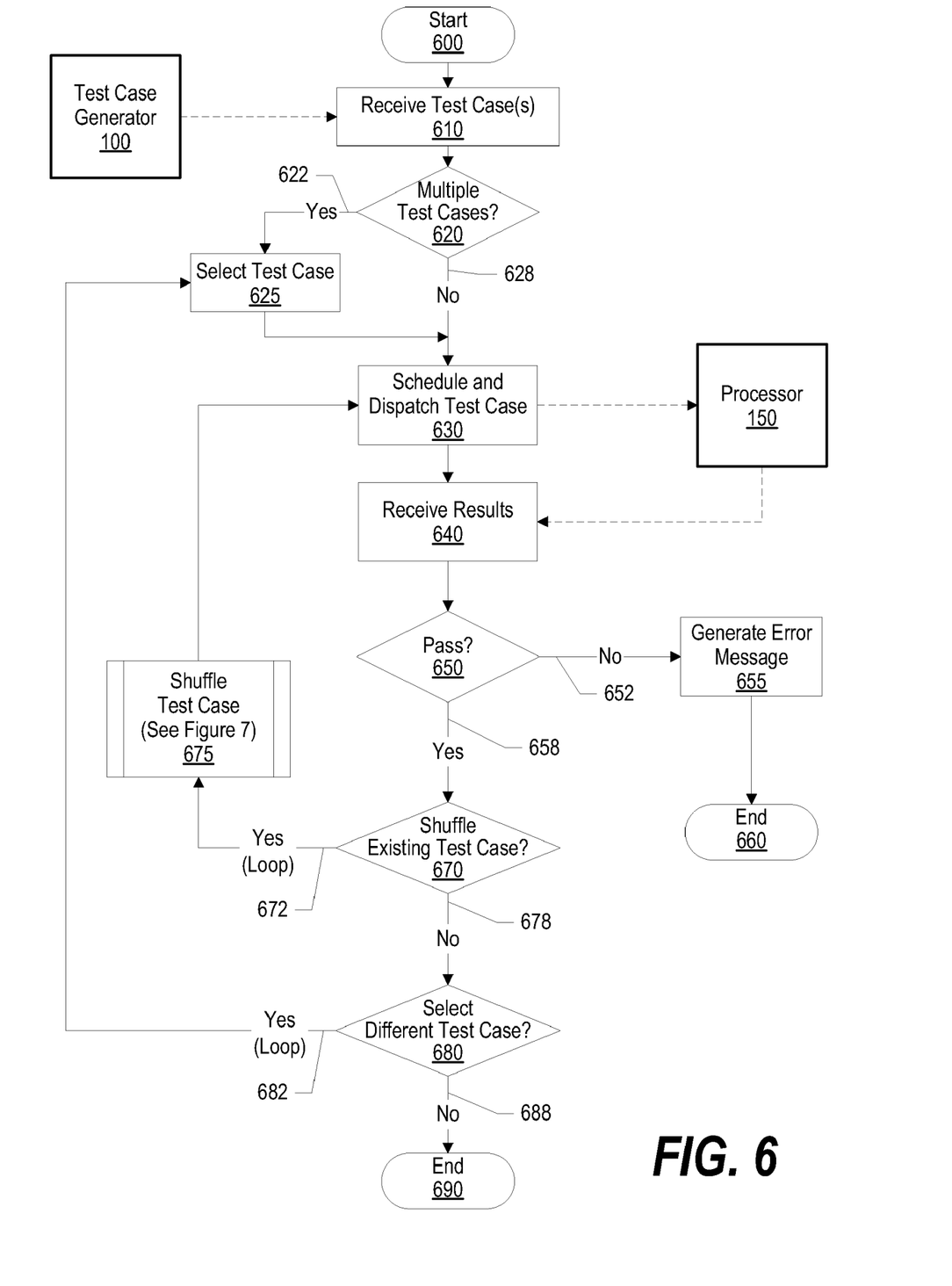
FIG. 6 is a flowchart showing steps taken in shuffling a test case's instruction order in order to efficiently test a processor.

FIG. 6 is a flowchart showing steps taken in shuffling a test case's instruction order in order to efficiently test a processor. Processing commences at 600, whereupon processing receives one or more test cases from test case generator 100 at step 610. Each test case includes multiple sub test cases as previously described herein.

A determination is made as to whether processing received multiple test cases (decision 620). If processing received multiple test cases, decision 620 branches to "Yes" branch 622 whereupon processing selects one of the test cases at step 625. On the other hand, if processing did not receive multiple test cases, decision 620 branches to "No" branch 628, bypassing test case selection step 625.

At step 630, processing schedules and dispatches the test case to processor 150. Processor 150 executes the test case and provides results, which are received at step 640. A determination is made as to whether the results pass (decision 650). If the results do not pass, decision 650 branches to "No" branch 652 whereupon processing generates an error message at step 655, and ends at 660.

On the other hand, if the results pass, decision 650 branches to "Yes" branch 658, whereupon a determination is made as to whether to shuffle the selected test case (decision 670). For example, processing may shuffle the selected test case twenty times in order to provide processor 150 with twenty different test case scenarios.

Figure 7:
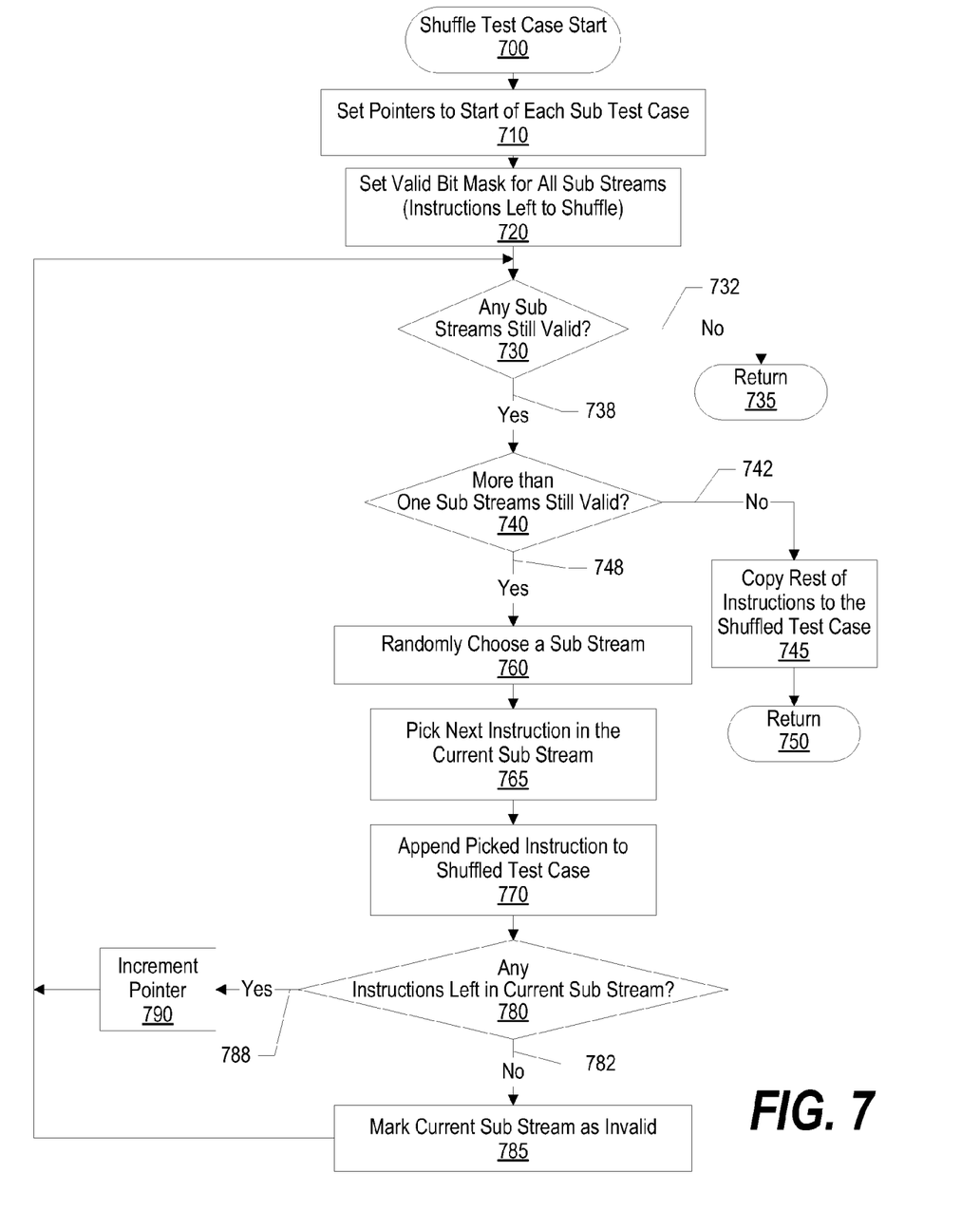
FIG. 7 is a flowchart showing steps taken in shuffling a test case.

If processing should shuffle the selected test case, decision 670 branches to "Yes" branch 672, which loops back to shuffle the test case in accordance with the invention described herein (pre-defined process block 675, see FIG. 7 and corresponding text for further details). Once shuffled, processing returns to step 630 to schedule and dispatch the shuffled test case to processor 150. This looping continues until processing has finished shuffling the selected test case, at which point decision 670 branches to "No" branch 678.

A determination is made as to whether to select a different test case if test case generator 100 provided multiple test cases (decision 680). If processing should select a different test case, decision 680 branches to "Yes" branch 682, which loops back to select, shuffle, and process the different test case. This looping continues until each test case has been selected and sufficiently shuffled, at which point decision 680 branches to "No" branch 688 whereupon processing ends at 690.

FIG. 7 is a flowchart showing steps taken in shuffling a test case that comprises sub test cases. Processing commences at 700, whereupon processing sets pointers to each of the sub test case's first instruction (step 710). At step 720, processing sets a valid bit mask for all sub streams (i.e. sub test cases), which are instructions within the sub test cases that are left to shuffle.

A determination is made as to whether there are any sub streams that are valid (decision 730). If there are not any sub streams that are valid, decision 730 branches to "No" branch 732 whereupon processing returns at 735. On the other hand, if there are any valid sub streams, decision 730 branches to "Yes" branch 738 whereupon a determination is made as to whether there is more than one valid sub stream still valid (decision 740). If there is not more than one valid sub stream still valid, decision 740 branches to "No" branch 742 whereupon processing copies the rest of the instructions in the valid sub stream to the shuffled test case (step 745), and returns at 750.

On the other hand, if there is more than one valid sub stream, which is typically the case at the beginning of the shuffling process, decision 740 branches to "Yes" branch 748 whereupon processing randomly selects one of the valid sub streams at step 760. At step 765, processing picks the instruction corresponding to the selected sub stream's pointer location and, at step 770, processing appends the picked instruction to the shuffled test case.

A determination is made as to whether there are any instructions left in the currently selected sub stream (decision 780). If there are not any instructions left in the selected sub stream, decision 780 branches to "No" branch 782 whereupon processing marks the selected sub stream invalid (step 785). On the other hand, if there are instructions left in the current sub stream, decision 780 branches to "Yes" branch 788 whereupon processing increments the selected sub stream's pointer at step 790, and loops back to continue to shuffle instructions. This continues until each of the instructions in each of the sub streams are appended to the test case, at which point processing returns at 750.

Figure 8:
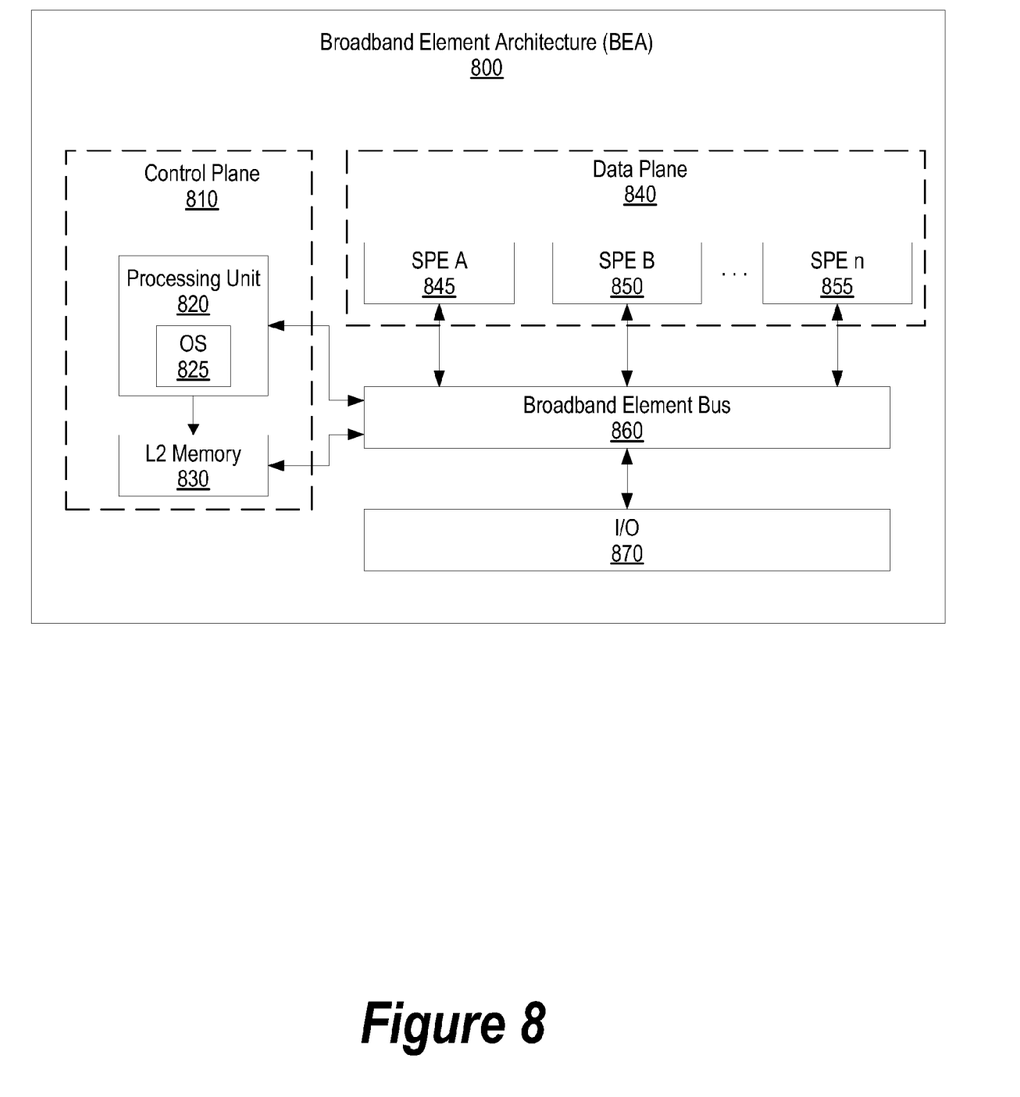
FIG. 8 is a diagram showing a broadband element architecture which includes a plurality of heterogeneous processors capable of implementing the invention described herein.

FIG. 8 is a diagram showing a broadband element architecture which includes a plurality of heterogeneous processors capable of implementing the invention described herein. The heterogeneous processors share a common memory and a common bus. Broadband element architecture (BEA) 800 sends and receives information to/from external devices through input output 870, and distributes the information to control plane 810 and data plane 840 using processor element bus 860. Control plane 810 manages BEA 800 and distributes work to data plane 840.

Control plane 810 includes processing unit 820 which runs operating system (OS) 825. For example, processing unit 820 may be a Power PC core that is embedded in BEA 800 and OS 825 may be a Linux operating system. Processing unit 820 manages a common memory map table for BEA 800. The memory map table corresponds to memory locations included in BEA 800, such as L2 memory 830 as well as non-private memory included in data plane 840.

Data plane 840 includes Synergistic processing element's (SPE) 845, 850, and 855. Each SPE is used to process data information and each SPE may have different instruction sets. For example, BEA 800 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPU) which is a processing core, such as a digital signal processor, a microcontroller, a microprocessor, or a combination of these cores.

SPE 845, 850, and 855 are connected to processor element bus 860, which passes information between control plane 810, data plane 840, and input/output 870. Bus 860 is an on-chip coherent multi-processor bus that passes information between I/O 870, control plane 810, and data plane 840. Input/output 870 includes flexible input-output logic which dynamically assigns interface pins to input output controllers based upon peripheral devices that are connected to BEA 800.

Figure 9:
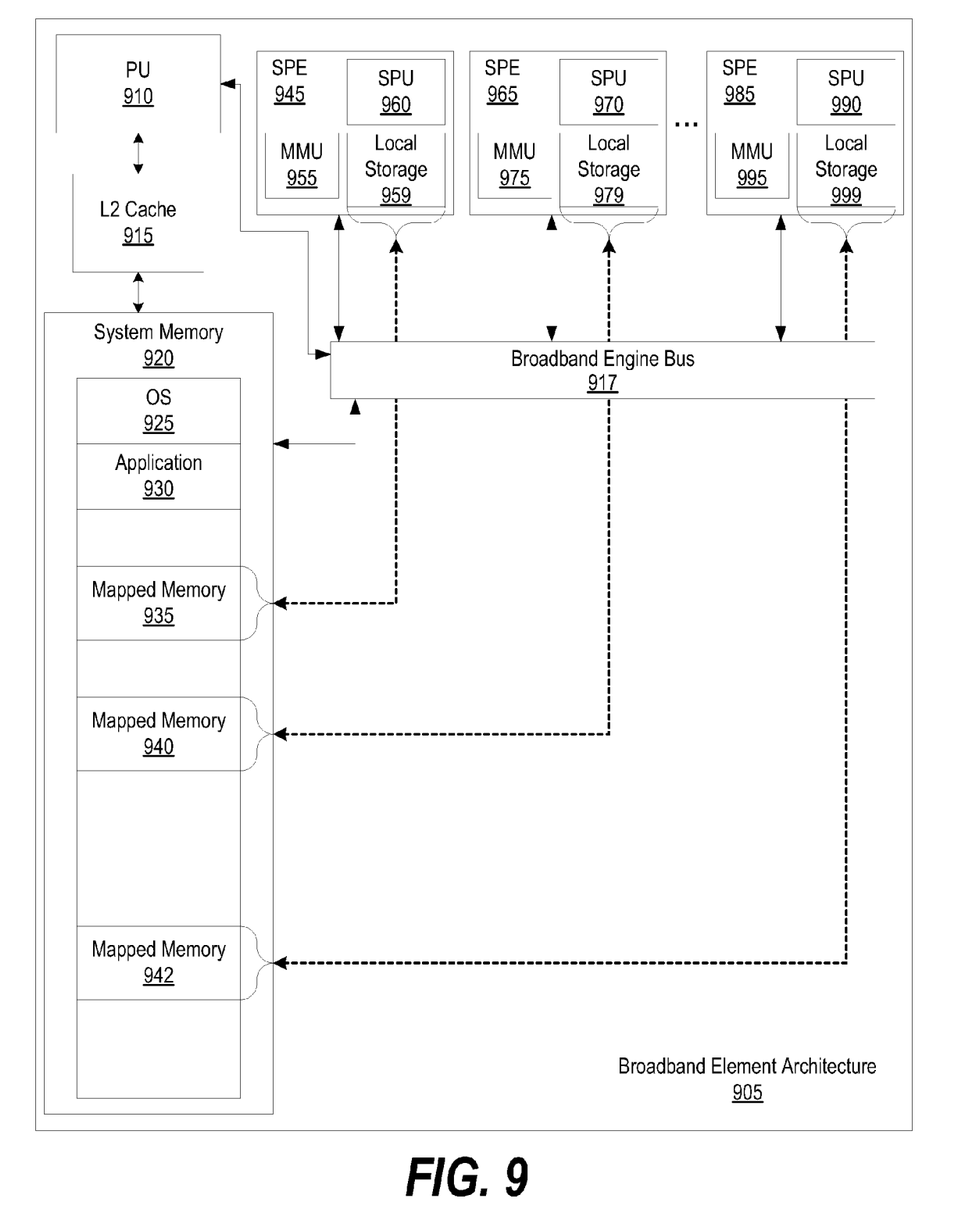
FIG. 9 is a block diagram illustrating a processing element having a main processor and a plurality of secondary processors sharing a system memory.

FIG. 9 is a block diagram illustrating a processing element having a main processor and a plurality of secondary processors sharing a system memory. Broadband Element Architecture (BEA) 905 includes processing unit (PU) 910, which, in one embodiment, acts as the main processor and runs the operating system. Processing unit 910 may be, for example, a Power PC core executing a Linux operating system. BEA 905 also includes a plurality of synergistic processing elements (SPEs) such as SPEs 945 through 985. Each SPE includes a synergistic processing unit (SPU) that act as secondary processing units to PU 910, a memory storage unit, and local storage. For example, SPE 945 includes SPU 960, MMU 955, and local storage 959; SPE 965 includes SPU 970, MMU 975, and local storage 979; and SPE 985 includes SPU 990, MMU 995, and local storage 999.

In one embodiment, the SPEs process data under the control of PU 910. The SPEs may be, for example, digital signal processing cores, microprocessor cores, micro controller cores, etc., or a combination of the above cores. In one embodiment, each one of the local stores is a storage area associated with a particular SPU. Each SPU can configure its local store as a private storage area, a shared storage area, or an SPU's local store may be partly private and partly shared.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 910 and by the other SPEs. An SPU may reserve part of its local store in order for the SPU to have fast, guaranteed access to some memory when performing tasks that require such fast access. The SPU may also reserve some of its local store as private when processing sensitive data, as is the case, for example, when the SPU is performing encryption/decryption.

The MMUs are responsible for transferring data between an SPU's local store and the system memory. In one embodiment, an MMU includes a direct memory access (DMA) controller configured to perform this function.

Each SPE may be set up to perform a different task, and accordingly, in one embodiment, each SPE may be accessed using different instruction sets. If BEA 905 is being used in a wireless communications system, for example, each SPE may be responsible for separate processing tasks, such as modulation, chip rate processing, encoding, network interfacing, etc. In another embodiment, each SPE may have identical instruction sets and may be used in parallel to perform operations benefiting from parallel processes.

The shared portion of the SPEs' local stores may be accessed by PU 910 as well as by the other SPEs by mapping each shared region to system memory 920. In one embodiment, PU 910 manages the memory map for the common system memory 920. The memory map table may include PU 910's L2 Cache 915, system memory 920, as well as the SPEs' shared local stores.

A portion of system memory 920 as shown is occupied by the operating system (OS 925). System Memory 925 also contains data 940, which represents data to be processed by SPU 910 as well as by the SPEs. In one embodiment, a process executing on the PU receives a request for a task involving the processing of large data. The PU first determines an optimum method for performing the task as well as an optimum placement of the data in common system memory 920. The PU may then initiate a transfer of the data to be processed from disk 935 to system memory 920. In one embodiment, the PU arranges the data in system memory 925 in data blocks the size of the registers of the SPEs. In one embodiment, the SPEs may have 128 registers, each register being 128 bits long.

The PU then searches for available SPEs and assigns blocks of data to any available SPEs for processing of the data. The SPEs can access the common system memory (through a DMA command, for example) transfer the data to the SPEs' local store, and perform the assigned operations. After processing the data, the SPEs may transfer the data (using DMA again, for example) back to common system memory 920. This procedure may be repeated as SPEs become available until all the data blocks have been processed.

Figure 10:
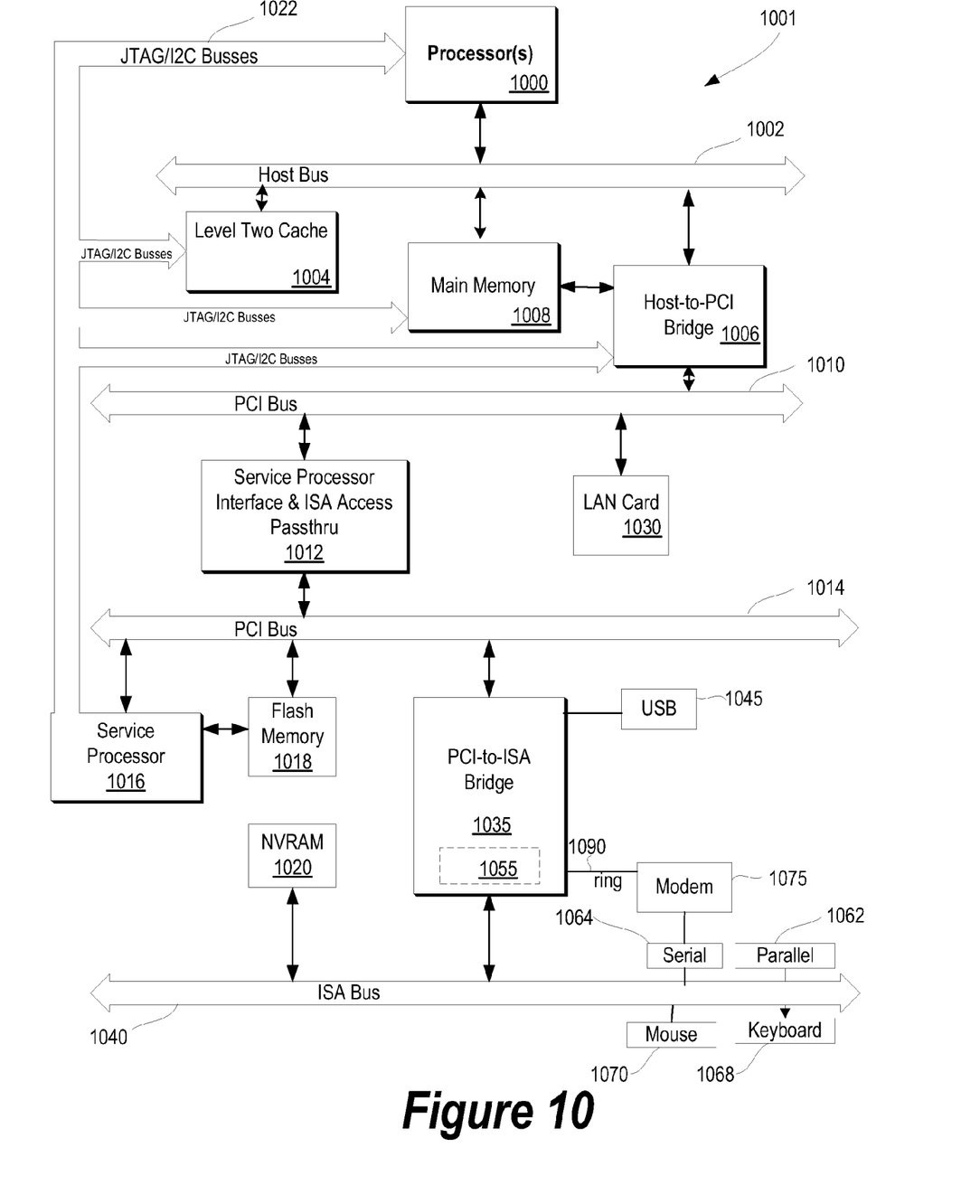
FIG. 10 is a block diagram of a computing device capable of implementing the present invention.

FIG. 10 illustrates information handling system 1001 which is a simplified example of a computer system capable of performing the computing operations described herein. Computer system 1001 includes processor 1000 which is coupled to host bus 1002. A level two (L2) cache memory 1004 is also coupled to host bus 1002. Host-to-PCI bridge 1006 is coupled to main memory 1008, includes cache memory and main memory control functions, and provides bus control to handle transfers among PCI bus 1010, processor 1000, L2 cache 1004, main memory 1008, and host bus 1002. Main memory 1008 is coupled to Host-to-PCI bridge 1006 as well as host bus 1002. Devices used solely by host processor(s) 1000, such as LAN card 1030, are coupled to PCI bus 1010. Service Processor Interface and ISA Access Pass-through 1012 provides an interface between PCI bus 1010 and PCI bus 1014. In this manner, PCI bus 1014 is insulated from PCI bus 1010. Devices, such as flash memory 1018, are coupled to PCI bus 1014. In one implementation, flash memory 1018 includes BIOS code that incorporates the necessary processor executable code for a variety of low-level system functions and system boot functions.

PCI bus 1014 provides an interface for a variety of devices that are shared by host processor(s) 1000 and Service Processor 1016 including, for example, flash memory 1018. PCI-to-ISA bridge 1035 provides bus control to handle transfers between PCI bus 1014 and ISA bus 1040, universal serial bus (USB) functionality 1045, power management functionality 1055, and can include other functional elements not shown, such as a real-time clock (RTC), DMA control, interrupt support, and system management bus support. Nonvolatile RAM 1020 is attached to ISA Bus 1040. Service Processor 1016 includes JTAG and I2C busses 1022 for communication with processor(s) 1000 during initialization steps. JTAG/I2C busses 1022 are also coupled to L2 cache 1004, Host-to-PCI bridge 1006, and main memory 1008 providing a communications path between the processor, the Service Processor, the L2 cache, the Host-to-PCI bridge, and the main memory. Service Processor 1016 also has access to system power resources for powering down information handling device 1001.

Peripheral devices and input/output (I/O) devices can be attached to various interfaces (e.g., parallel interface 1062, serial interface 1064, keyboard interface 1068, and mouse interface 1070 coupled to ISA bus 1040. Alternatively, many I/O devices can be accommodated by a super I/O controller (not shown) attached to ISA bus 1040.

In order to attach computer system 1001 to another computer system to copy files over a network, LAN card 1030 is coupled to PCI bus 1010. Similarly, to connect computer system 1001 to an ISP to connect to the Internet using a telephone line connection, modem 10105 is connected to serial port 1064 and PCI-to-ISA Bridge 1035.

While FIG. 10 shows one information handling system that employs processor(s) 1000, the information handling system may take many forms. For example, information handling system 1001 may take the form of a desktop, server, portable, laptop, notebook, or other form factor computer or data processing system. Information handling system 1001 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving a test case that includes a first sub test case and a second sub test case, the first sub test case including a first set of instructions organized in a first instruction order and the second sub test case including a second set of instructions organized in a second instruction order;
   executing the test case, the first set of instructions executed in the first instruction order and the second set of instructions executed in the second instruction order;
   after the execution, shuffling the test case that results in a shuffled instruction order, the shuffled instruction order including one or more of the first set of instructions inserted between one or more of the second set of instructions, wherein the first instruction order relative to the first set of instructions remains the same in the shuffled instruction order, and wherein the second instruction order relative to the second set of instructions remains the same in the shuffled instruction order; and
   executing the shuffled test case in the shuffled instruction order.

2. The method of claim 1 wherein, prior to receiving the test case, the method further comprises:
   building the test case, the building comprising:
      identifying a first set of processor resources and a second set of processor resources, the first set of processor resources being different than the second set of processor resources;
      allocating the first set of processor resources to the first sub test case and allocating the second set of processor resources to the second sub test case;
      building the first sub test case using the first set of instructions, wherein the first set of instructions correspond to the first set of processor resources;
      building the second sub test case using the second set of instructions, wherein the second set of instructions correspond to the second set of processor resources; and
      including the built first sub test case and the built second sub test case into the test case.

3. The method of claim 1 wherein, during the shuffling, the method further comprises:
   determining that one of the first instructions is a branch instruction;
   identifying a block of instructions that correspond to the branch instruction; and
   keeping the block of instructions together during the shuffling without inserting one of the second set of instructions within the block of instructions.

4. The method of claim 1 wherein the first sub test case includes a generic instruction block, the method further comprising:
   during the shuffling, keeping the generic instruction block together without inserting one of the second set of instructions between instructions included in the generic instruction block.

5. The method of claim 1 further comprising:
   randomly selecting one of the sub test cases;
   identifying an instruction pointer that corresponds to the selected sub test case; and
   appending an instruction corresponding to the instruction pointer location to the shuffled test case.

6. The method of claim 1 further comprising:
   receiving a different test case that includes a third sub test case and a fourth sub test case, the third sub test case including a third set of instructions organized in a third instruction order and the fourth sub test case including a fourth set of instructions organized in a fourth instruction order;

executing the different test case, the third set of instructions executed in the third instruction order and the fourth set of instructions executed in the fourth instruction order;

after executing the different test case, shuffling the different test case that results in a different shuffled instruction order, the different shuffled instruction order including one or more of the third set of instructions inserted between one or more of the fourth set of instructions, wherein the third instruction order relative to the third set of instructions remains the same in the different shuffled instruction order, and wherein the fourth instruction order relative to the fourth set of instructions remains the same in the different shuffled instruction order; and executing the different shuffled test case in the different shuffled instruction order.

7. The method of claim 6 wherein the test case executes on a first processor and the different test case executes on a second processor.

8. The method of claim 1 wherein executing the test case and executing the shuffled test case produce identical results.

9. An information handling system comprising:
one or more processors;
a memory accessible by the processors;
one or more nonvolatile storage devices accessible by the processors; and
a set of instructions stored in the memory, wherein one or more of the processors executes the set of instructions in order to perform actions of:
receiving a test case that includes a first sub test case and a second sub test case, the first sub test case including a first set of instructions organized in a first instruction order and the second sub test case including a second set of instructions organized in a second instruction order;
executing the test case, the first set of instructions executed in the first instruction order and the second set of instructions executed in the second instruction order;
after the execution, shuffling the test case that results in a shuffled instruction order, the shuffled instruction order including one or more of the first set of instructions inserted between one or more of the second set of instructions, wherein the first instruction order relative to the first set of instructions remains the same in the shuffled instruction order, and wherein the second instruction order relative to the second set of instructions remains the same in the shuffled instruction order; and
executing the shuffled test case in the shuffled instruction order.

10. The information handling system of claim 8 wherein, prior to receiving the test case, further comprising an additional set of instructions in order to perform actions of:
building the test case, the building comprising:
identifying a first set of processor resources and a second set of processor resources, the first set of processor resources being different than the second set of processor resources;
allocating the first set of processor resources to the first sub test case and allocating the second set of processor resources to the second sub test case;
building the first sub test case using the first set of instructions, wherein the first set of instructions correspond to the first set of processor resources;
building the second sub test case using the second set of instructions, wherein the second set of instructions correspond to the second set of processor resources; and
including the built first sub test case and the built second sub test case into the test case.

11. The information handling system of claim 8 further comprising an additional set of instructions in order to perform actions of:
determining that one of the first instructions is a branch instruction;
identifying a block of instructions that correspond to the branch instruction; and
keeping the block of instructions together during the shuffling without inserting one of the second set of instructions within the block of instructions.

12. The information handling system of claim 8 wherein the first sub test case includes a generic instruction block, the information handling system further comprising an additional set of instructions in order to perform actions of:
during the shuffling, keeping the generic instruction block together without inserting one of the second set of instructions between instructions included in the generic instruction block.

13. The information handling system of claim 8 further comprising an additional set of instructions in order to perform actions of:
randomly selecting one of the sub test cases;
identifying an instruction pointer that corresponds to the selected sub test case; and
appending an instruction corresponding to the instruction pointer location to the shuffled test case.

14. The information handling system of claim 8 further comprising an additional set of instructions in order to perform actions of:
receiving a different test case that includes a third sub test case and a fourth sub test case, the third sub test case including a third set of instructions organized in a third instruction order and the fourth sub test case including a fourth set of instructions organized in a fourth instruction order;
executing the different test case, the third set of instructions executed in the third instruction order and the fourth set of instructions executed in the fourth instruction order;
after executing the different test case, shuffling the different test case that results in a different shuffled instruction order, the different shuffled instruction order including one or more of the third set of instructions inserted between one or more of the fourth set of instructions, wherein the third instruction order relative to the third set of instructions remains the same in the different shuffled instruction order, and wherein the fourth instruction order relative to the fourth set of instructions remains the same in the different shuffled instruction order; and
executing the different shuffled test case in the different shuffled instruction order.

15. A computer program product stored on a computer operable media, the computer operable media containing instructions for execution by a computer, which, when executed by the computer, cause the computer to implement a method of processing test patterns, the method comprising:
receiving a test case that includes a first sub test case and a second sub test case, the first sub test case including a first set of instructions organized in a first instruction order and the second sub test case including a second set of instructions organized in a second instruction order;

executing the test case, the first set of instructions executed in the first instruction order and the second set of instructions executed in the second instruction order;

after the execution, shuffling the test case that results in a shuffled instruction order, the shuffled instruction order including one or more of the first set of instructions inserted between one or more of the second set of instructions, wherein the first instruction order relative to the first set of instructions remains the same in the shuffled instruction order, and wherein the second instruction order relative to the second set of instructions remains the same in the shuffled instruction order; and executing the shuffled test case in the shuffled instruction order.

16. The computer program product of claim 15 wherein, prior to receiving the test case, the method further comprises:

building the test case, the building comprising:

identifying a first set of processor resources and a second set of processor resources, the first set of processor resources being different than the second set of processor resources;

allocating the first set of processor resources to the first sub test case and allocating the second set of processor resources to the second sub test case;

building the first sub test case using the first set of instructions, wherein the first set of instructions correspond to the first set of processor resources;

building the second sub test case using the second set of instructions, wherein the second set of instructions correspond to the second set of processor resources; and including the built first sub test case and the built second sub test case into the test case.

17. The computer program product of claim 15 wherein, during the shuffling, the method further comprises:

determining that one of the first instructions is a branch instruction;

identifying a block of instructions that correspond to the branch instruction; and keeping the block of instructions together during the shuffling without inserting one of the second set of instructions within the block of instructions.

18. The computer program product of claim 15 wherein the first sub test case includes a generic instruction block, the method further comprising:

during the shuffling, keeping the generic instruction block together without inserting one of the second set of instructions between instructions included in the generic instruction block.

19. The computer program product of claim 15 wherein the method further comprises:

randomly selecting one of the sub test cases;

identifying an instruction pointer that corresponds to the selected sub test case; and appending an instruction corresponding to the instruction pointer location to the shuffled test case.

20. The computer program product of claim 15 wherein the method further comprises:

receiving a different test case that includes a third sub test case and a fourth sub test case, the third sub test case including a third set of instructions organized in a third instruction order and the fourth sub test case including a fourth set of instructions organized in a fourth instruction order;

executing the different test case, the third set of instructions executed in the third instruction order and the fourth set of instructions executed in the fourth instruction order;

after executing the different test case, shuffling the different test case that results in a different shuffled instruction order, the different shuffled instruction order including one or more of the third set of instructions inserted between one or more of the fourth set of instructions, wherein the third instruction order relative to the third set of instructions remains the same in the different shuffled instruction order, and wherein the fourth instruction order relative to the fourth set of instructions remains the same in the different shuffled instruction order; and executing the different shuffled test case in the different shuffled instruction order.

* * * * *